United States Patent Office 2,891,956
Patented June 23, 1959

2,891,956

DEHYDROGENATION PROCESS AND IRON-CHROMIUM-CALCIUM CATALYST

Lyman Malcolm Oberlin and Emory W. Pitzer, Bartlesville, Okla., assignors to Phillips Petroleum Company, a corporation of Delaware No Drawing. Application March 14, 1955
Serial No. 494,228

14 Claims. (Cl. 260—290)

This invention relates to catalysts. In another aspect, it relates to a dehydrogenation process utilizing such catalysts.

In the catalytic dehydrogenation of mono-olefins, alkylpyridines, and alkyl aromatics to produce diolefins, alkenylpyridines and alkenyl aromatics, respectively, hereafter referred to as the specified dehydrogenation reactions, the first catalytic materials developed required periodic regeneration steps to remove the coke or carbonaceous material deposited on the catalyst during the dehydrogenation reaction. Later, catalysts were developed which were self-regenerating when the reactant materials were admixed with steam so that the operation could be carried out in a continuous manner without periodic regeneration.

Unfortunately, difficulties are encountered in the use of certain of these catalysts. In particular, when equilibrium conditions are attained, there is a certain amount of carbon or coke present in the catalyst even where the self-regenerating type is used and steam is admixed with the feed prior to the dehydrogenation step. This is especially true of the specified dehydrogenation reactions. The presence of this coke has an obvious deleterious effect upon the reaction, and even a small reduction in the amount of carbonaceous material present provides a very definite and desirable operating advantage in commercial production. Additionally, of course, the yield of diolefins must be maintained at a high value to provide a practical process on a commercial scale. Consequently, a definite need has arisen for a catalyst which has adequate yield of diolefins for commercial operation but is less subject to coke deposition.

We have found that these desirable conditions can be obtained by utilizing an iron oxide catalyst promoted with a calcium compound, specifically the oxide or carbonate which is stabilized with a small amount of chromium oxide. The use of such catalyst provides an adequate yield of diolefins for commercial operation and yet substantially reduces the amount of carbon present on the catalyst at equilibrium conditions. The chromium oxide content appears to be rather critical and should be maintained between 0.5 and 5.0, preferably 1 and 4 percent by weight.

Surprisingly, this desirable result is apparently peculiar to calcium, and is not produced by the other alkaline earth materials such as strontium and barium nor by the alkali metals such as potassium.

Th catalyst of this invention as prepared consists essentially of chromium oxide, calcium carbonate and iron oxide. The chromium oxide, calculated as $Cr_2O_3$, is present in the amount of 0.5 to 5.0, preferably 1.0 to 4.0 weight percent; the calcium carbonate is present in the amount of 15 to 50 weight percent; and the remainder of the catalyst is iron oxide, calculated as $Fe_2O_3$. Obviously, small amounts of impurities may be present, but the catalyst consists essentially of these components.

When the chromium oxide content is below 1.0 percent, the catalyst is substantially inactive, whereas the catalyst is excessively active and causes formation of high quantities of undesirable by-products when the chromium oxide content exceeds 4.0 percent. Moreover, reduction of the surface area below 4 square meters per gram is undesirable.

Numerous methods for preparing this catalyst are available. For example, the catalyst components can be brought together in a mill, such as a hammer mill, and milled to break up the agglomerates to small size. Thereupon the milled mixture is pelleted and dried, and the catalyst used in the dehydrogenation process. Coprecipitation, impregnation, and other known methods of manufacturing the catalyst can also be used with satisfactory results.

Rather than using iron oxide, calcium carbonate, and chromium oxide as starting materials, the nitrates of these compounds may be used and thermally decomposed in the process of preparing the catalyst. As carbon dioxide is present in the reaction mixture in the dehydrogenation process, an equilibrium between calcium carbonate, calcium oxide, and carbon dioxide is reached. Thus, calcium oxide and calcium carbonate are substantial equivalents in the catalyst preparation.

In the dehydrogenation process utilizing this catalyst in the production of diolefins from mono-olefins, alkenylpyridines from alkylpyridines or alkenyl aromatics from alkyl aromatics the reaction is carried out at high temperature and in the presence of steam. The temperature is ordinarily in the range of 1050 to 1300° F., and the steam diluent is utilized in the amount of 1 to 20 mols of steam per mol of mono-olefin or alkyl aromatic charged. It is advantageous to maintain a pressure as low as feasible, and substantially atmospheric pressure is ordinarily utilized. Elevated pressure is operable with respect to the production of the diolefins or alkenyl aromatics.

Mono-olefins most commonly used in producing diolefins of the same number of carbon atoms are butenes and pentenes, butadiene and pentadiene being the products of the process. Also the dehydrogenation of ethylbenzene to styrene and the dehydrogenation of 2-methyl-5-ethylpyridine to 2-methyl-5-vinylpyridine are important applications of the invention. However, the process is applicable generally to mono-olefins and diolefins, although mono-olefins of 8 or less carbon atoms and alkyl benzenes or alkylpyridines with 1 to 4 alkyl groups each having 6 or less carbon atoms with at least one alkyl group of two or more carbon atoms are most applicable from the standpoint of yield, selectivity and economics.

The process is ordinarily carried out by forming a preheated mixtur of the mono-olefin and steam, passing the charge mixture over the catalyst at the desired temperature and recovering the product from the reaction mixture coming from the catalyst cases. Recycle of unconverted mono-olefin is utilized in substantially all applications. The catalyst chambers may be adiabatic or isothermal, though isothermal reactors are more desirable from a processing standpoint.

Advantageously, 0.5 to 2 mol percent of carbon dioxide, based on the total feed, can be added with resultant minimization of migration of the calcium compound through the catalyst bed and possible loss thereof from the reaction zone. In some cases, the catalyst can be improved by calcining the iron oxide before making the catalyst.

The following examples illustrate the reduction in amount of coke present on the catalyst at equilibrium conditions together with maintenance of a selectivity, yield and conversion which are entirely adequate for commercial operation. It will be noted that these latter variables compare favorably with those obtained with a potassium carbonate promoted catalyst, and are far superior to the results obtained with other alkaline earth materials, specifically barium oxide and strontium carbonate, as promoters.

In the table, selectivity can be defined as mols of butadiene produced per 100 mols of butene destroyed, yield can be defined as mols of butadiene produced per 100 mols of butene charged on a once through basis, conversion can be defined as the mols of butene destroyed per 100 mols of butene charged on a once through basis, and the carbon (as oxide) can be defined as the weight percent of carbon (calculated as the oxide) present in the effluent gas.

In the following examples, catalysts A, B, C and D were prepared by combining the indicated materials in a hamer mill, milling the mixture to reduce the particle size, pelleting the milled mixture with tannic acid-water binder into ⅛" pellets, drying for 18 hours at 340° F., and then placing the pelleted catalyst in the apparatus.

The process cycle was started by passing nitrogen over the catalyst while heating to about 1000–1050° F., at which temperature steam was started over the catalyst for 30 minutes. At the end of 30 minutes, 2-butene was started over the catalyst along with the steam and the temperature was raised to 1130° F. in about 30 minutes to 1 hour. When the process temperature of 1130° F. was reached, the temperature was maintained constant.

The following runs were operated at a temperature of 1130° F., pressure of 1 atmosphere, 2-butene space velocity of 400 and a steam/hydrocarbon mol ratio of 12/1.

Table I

| Catalyst | A | B | C | D |
| --- | --- | --- | --- | --- |
| Initial Composition, Wt. Percent: | | | | |
| $Fe_2O_3$ | 67 | 67 | 67 | 67 |
| $K_2CO_3$ | | 30 | | |
| $CaCO_3$ | 30 | | | |
| $BaO$ | | | 30 | |
| $SrCO_3$ | | | | 30 |
| $Cr_2O_3$ | 3 | 3 | 3 | 3 |
| Catalyst Density, g./cc. (apparent) | 1.77 | 1.70 | 2.10 | 2.20 |
| Equilibrium Carbon on Catalyst, grams | 0.13 | 0.19 | 0.20 | 0.29 |
| 9.5 Hour Results Conversion | 23.4 | 25.9 | 12.4 | [1] 13.8 |
| Yield $C_4H_6$ | 19.9 | 23.3 | 6.0 | [1] 5.4 |
| Selectivity | 85.0 | 90.0 | 48.5 | [1] 39.1 |

[1] 9.0 hour results.

Ten cubic centimeters of catalyst were used in each of the above runs.

From the foregoing data, it will be noted that catalyst A, the catalyst of the invention, was tremendously superior to catalysts C and D where barium oxide and strontium carbonate, respectively, were substituted for the calcium carbonate of catalyst A. Thus, the conversion in each case was over twice as great for the catalysts of the invention, the yield was about three times as great, and the increase in selectivity was of the magnitude of 37 to 46 percentage units. Moreover, the carbon on the catalyst at equilibrium conditions was substantially less with catalyst A than catalyst C or D. Moreover, the carbon on the catalyst was reduced by more than 30 percent by substitution of calcium carbonate for the potassium carbonate of catalyst B, with a decrease in selectivity of less than 1 percent. Consequently, the calcium carbonate promoter appears to have unique properties and the ability to provide adequate conversion, yield and selectivity with a substantial decrease in the amount of carbon present on the catalyst.

While the invention has been described in connection with a present, preferred embodiment thereof, it is to be understood that this description is illustrative only and is not intended to limit the invention.

We claim:

1. A method of dehydrogenating an organic compound selected from the group consisting of mono-olefins, alkylpyridines and alkyl aromatics which comprises passing the vapors of said compound together with steam into contact with an iron oxide catalyst consisting essentially of 0.5 to 5.0 weight percent chromium oxide, 15 to 50 weight percent of a calcium compound selected from the group consisting of calcium oxide and calcium carbonate, and the remainder iron oxide.

2. In the dehydrogenation of butenes, the steps which comprise contacting a mixture of said butenes and steam with a catalyst consisting essentially of 1.0 to 4.0 weight percent chromium oxide, 15 to 50 weight percent of a calcium compound selected from the group consisting of calcium oxide and calcium carbonate, and the remainder iron oxide.

3. In the dehydrogenation of ethylbenzene, the steps which comprise contacting a mixture of said ethylbenzene and steam with a catalyst consisting essentially of 1.0 to 4.0 weight percent chromium oxide, 15 to 50 weight percent of a calcium compound selected from the group consisting of calcium oxide and calcium carbonate, and the remainder iron oxide.

4. In the dehydrogenation of 2-methyl-5-ethylpyridine, the steps which comprise contacting a mixture of said 2-methyl-5-ethylpyridine and steam with a catalyst consisting essentially of 1.0 to 4.0 weight percent chromium oxide, 15 to 50 weight percent of a calcium compound selected from the group consisting of calcium oxide and calcium carbonate, and the remainder iron oxide.

5. A method of dehydrogenating an organic compound selected from the group consisting of mono-olefins, alkylpyridines and alkyl aromatics which comprises passing the vapors of said compound together with one to 20 mols of steam per mol of said compound charged into contact with a catalyst consisting essentially of 1.0 to 4.0 weight percent chromium oxide, 15 to 50 weight percent of a calcium compound selected from the group consisting of calcium oxide and calcium carbonate, and the remainder iron oxide, at a temperature within the range of 1050 to 1300° F.

6. A method of dehydrogenating an organic compound selected from the group consisting of mono-olefins, alkylpyridines and alkyl aromatics which comprises passing the vapors of said compound together with 1 to 20 mols of steam per mol of said compound charged, together with 0.5 to 2 mol percent, based on the total feed, of carbon dioxide, into contact with a catalyst consisting essentially of 1.0 to 4.0 weight percent chromium oxide, 15 to 50 weight per cent of a calcium compound selected from the group consisting of calcium oxide and calcium carbonate, and the remainder iron oxide, at a temperature within the range of 1050 to 1300° F.

7. In the dehydrogenation of butenes, the steps which comprise contacting a mixture of said butenes and 1 to 20 mols of steam per mol of butenes charged with a catalyst consisting essentially of 1.0 to 4.0 weight percent chromium oxide, 15 to 50 weight percent of a calcium compound selected fro mthe group consisting of calcium oxide and calcium carbonate, and the remainder iron oxide, at a temperature within the range of 1050 to 1300° F.

8. In the dehydrogenation of ethylbenzene, the steps which comprise contacting ethylbenzene and steam in the amount of 1 to 20 mols of steam per mol of ethylbenzene charged with a catalyst consisting essentially of 1.0 to 4.0 weight percent chromium oxide, 15 to 50 weight percent of a calcium compound selected from the group consisting of calcium oxide and calcium carbonate, and the remainder iron oxide, at a temperature within the range of 1050 to 1300° F.

9. In the dehydrogenation of 2-methyl-5-ethylpyridine, the steps which comprise contacting 2-methyl-5-ethylpyridine and steam in the amount of 1 to 20 mols of steam per mol of 2-methyl-5-ethylpyridine charged with a catalyst consisting essentially of 1.0 to 4.0 weight percent chromium oxide, 15 to 50 weight percent of a calcium compound selected from the group consisting of calcium oxide and calcium carbonate, and the remainder iron oxide, at a temperature within the range of 1050 to 1300° F.

10. The method of claim 6 wherein the catalyst is formed by mixing the components in a mill to break up the agglomerates to small sizes, pelleting and drying the resulting milled mixture.

11. The method of claim 6 wherein the catalyot is formed by thermally decomposing iron nitrate, calcium nitrate, and chromium nitrate in the proper proportions as to provide the catalyst specified by claim 6.

12. The process of dehydrogenating 2-butene which comprises contacting 2-butene together with about 12 mols of steam per mol of 2-butene with a catalyst consisting essentially of 67 weight percent iron oxide, 30 weight percent calcium carbonate and 3 weight percent chromium oxide at a temperature of about 1130° F., a pressure of one atmosphere, and a space velocity of 400, and recovering butadiene as a product.

13. In the dehydrogenation of butenes, the steps which comprise charging a catalyst consisting essentially of 1.0 to 4.0 weight percent chromium oxide, 15 to 50 weight percent of a calcium compound selected from the group consisting of calcium oxide and calcium carbonate, and the remainder iron oxide to a catalytic conversion zone, and passing a mixture of butenes together with 1 to 20 mols of steam per mol of butene charged through said reaction zone in contact with the catalyst therein, and recovering from said reaction zone an effluent containing butadiene.

14. In the dehydrogenation of ethylbenzene, the steps which comprise charging a catalyst consisting essentially of 1.0 to 4.0 weight percent chromium oxide, 15 to 50 weight percent of a calcium compound selected from the group consisting of calcium oxide and calcium carbonate, and the remainder iron oxide to a catalytic conversion zone, and passing the vapors of ethylbenzene together with 1 to 20 mols of steam per mol of ethylbenzene charged to said catalytic conversion zone in contact with the catalyst therein, and recovering an effluent containing styrene from said catalytic conversion zone.

References Cited in the file of this patent

UNITED STATES PATENTS

| | | |
|---|---|---|
| 2,376,252 | Hull | May 15, 1945 |
| 2,408,140 | Gutzeit | Sept. 24, 1946 |
| 2,444,035 | Corson et al. | June 29, 1948 |
| 2,449,004 | Morrell et al. | Sept. 7, 1948 |
| 2,605,275 | Kearby et al. | July 29, 1952 |
| 2,666,086 | Pitzer | Jan. 12, 1954 |
| 2,682,552 | Black et al. | June 29, 1954 |
| 2,775,637 | Lanning et al. | Dec. 25, 1956 |